United States Patent
Nandagopalan et al.

(10) Patent No.: US 11,570,814 B2
(45) Date of Patent: Jan. 31, 2023

(54) DEVICES, SYSTEMS AND METHODS FOR ACCESSING RANDOM ACCESS RESOURCE UNITS OF A WIRELESS CHANNEL

(71) Applicant: Cypress Semiconductor Corporation, San Jose, CA (US)

(72) Inventors: Saishankar Nandagopalan, San Diego, CA (US); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 9 days.

(21) Appl. No.: 17/385,227

(22) Filed: Jul. 26, 2021

(65) Prior Publication Data

US 2022/0039162 A1  Feb. 3, 2022

Related U.S. Application Data

(60) Provisional application No. 63/059,055, filed on Jul. 30, 2020.

(51) Int. Cl.
*H04W 74/08* (2009.01)
*H04W 84/12* (2009.01)

(52) U.S. Cl.
CPC ... *H04W 74/0816* (2013.01); *H04W 74/0841* (2013.01); *H04W 84/12* (2013.01)

(58) Field of Classification Search
None
See application file for complete search history.

*Primary Examiner* — James P Duffy

(57) ABSTRACT

A method can include wireless device operations, including receiving a trigger communication that identifies available random access resource units (RA RUs), the RA RUs being portions of transmission channel for a wireless system. In response to a back-off value and a number of available RA RUs, selecting or not selecting one RA RU as a transmission RA RU. In response to not selecting a transmission RA RU, monitoring for wireless responses following the trigger communication to determine unselected RA RUs, designating one unselected RA RUs as an alternate RA RU; and transmitting uplink data on the alternate RA RU. The unselected RA RUs comprise any RA RUs that remain after other wireless devices have selected RA RUs in response to the trigger communication. Corresponding devices and systems are also disclosed.

20 Claims, 17 Drawing Sheets

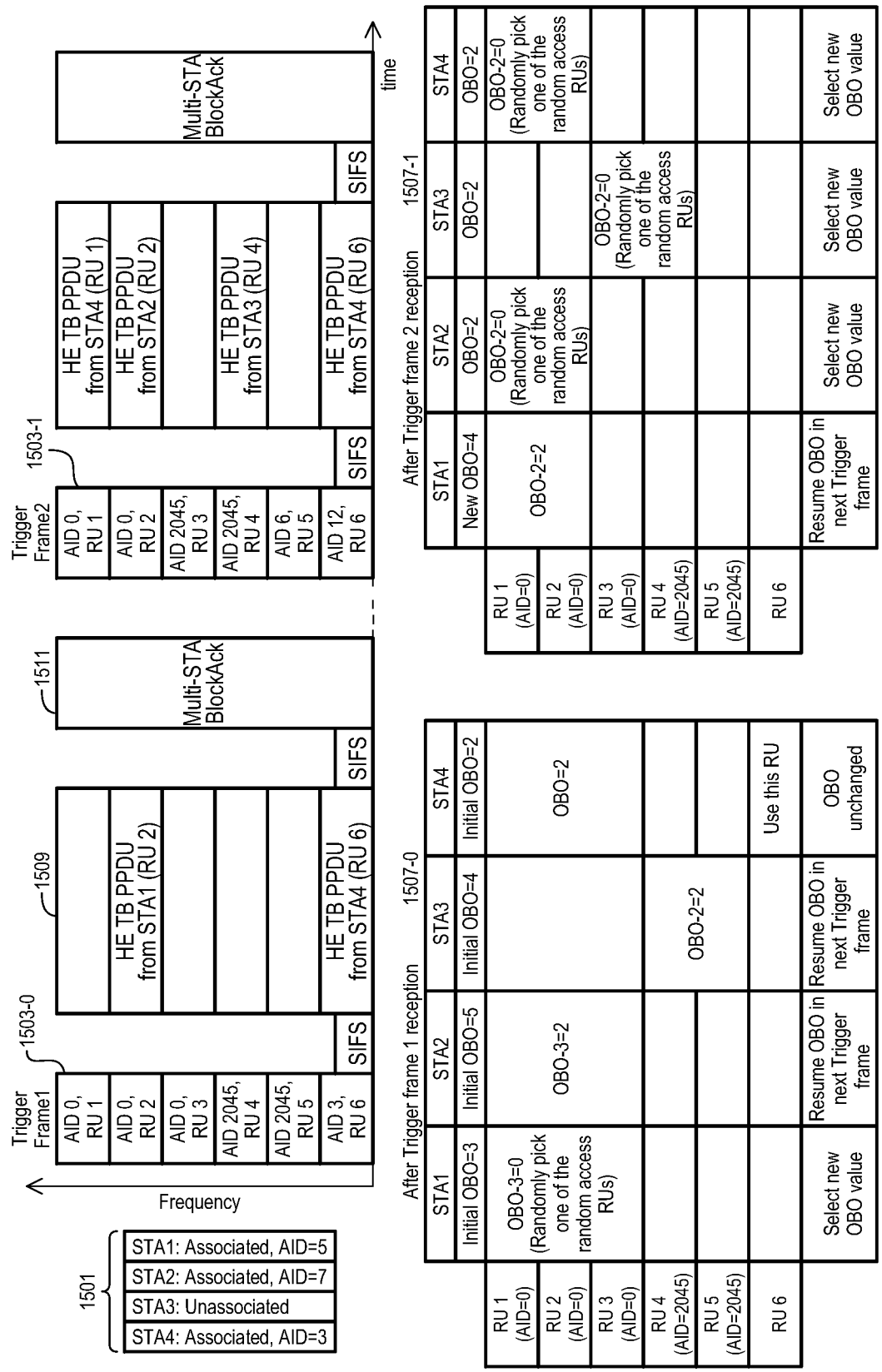
FIG. 15A (BACKGROUND)

(BACKGROUND)

(BACKGROUND)

DEVICES, SYSTEMS AND METHODS FOR ACCESSING RANDOM ACCESS RESOURCE UNITS OF A WIRELESS CHANNEL

RELATED APPLICATIONS

This application claims the benefit of U.S. Provisional Patent Application No. 63/059,055 filed Jul. 30, 2020, the contents of which are incorporated by reference herein.

TECHNICAL FIELD

The present disclosure relates generally to wireless networks, and more particularly to wireless networks that enable random access to resource units of a channel in response to trigger communications.

BACKGROUND

Conventional WiFi devices can establish communication connections over a number of channels, each occupying a different frequency bandwidth. To increase bandwidth efficiency, wireless standards have been developed that divide an available channel to enable multi-user multiple-input multiple output (MU-MIMO) communications. According to the IEEE 802.11ax and other standards, data for different destinations can be transmitted on different resource units (RUs), which each occupy a different portion of the channel bandwidth. Orthogonal frequency division multiple access (OFDMA) modulation is used to transmit different data streams on the separate RUs in parallel with one another. For efficient use of available RUs, the IEEE 802.11ax standard includes uplink OFDMA-based random access (UORA), which allows multiple stations (STAs) to randomly access the medium with parallel RU transmissions.

FIG. 15A is a timing diagram showing UORA operations. In the example shown, an operating environment can include four STAs 1501 (STA1-4) and an access point (AP). STA1, STA2 and STA4 are associated with the AP, while STA3 is unassociated. In a UORA operation, an AP can issue a broadcast trigger frame 1503-0 which indicates RUs available for random access, including RUs with AID 0 for associated STAs (RU 1/2/3), and RUs with AID 2045 for unassociated STAs (RU 4/5). In response to the trigger frame 1503-0, STAs can perform a contention process to determine if they will transmit on an available RU.

FIG. 15B shows a UORA contention process for a STA. A trigger frame can be received which indicates the number of random access RUs (given as "x") 1505-0. A STA can generate a random value W, selected from between 0 and Cwin-1 (where Cwin is a contention window). The random value W serves as an OFDMA Back-off (OBO) value 1505-1. The value W can be decremented 1505-2 and compared to the available RUs (W−x) 1505-2. If the number is not greater than zero (No from 1505-3), the STA can transmit on a RU randomly selected from those indicated as available in the trigger frame 1505-5. If the transmission is successful (Yes from 1505-6), the STA can randomly select another OBO value and wait for a next trigger frame 1505-8.

If the transmission is not successful (No from 1505-6), the STA can randomly select another OBO value between 0 and 2× of a previous Cwin. The STA can then wait for a new trigger frame 1505-8, and decrement its OBO value and repeat a comparison to available RUs to see if it has won contention. If an OBO value remains greater than zero (Yes from 1505-3), the STA can also wait for a next trigger frame 1505-8.

Referring back to FIG. 15A, operations in response to a first trigger frame are shown as 1507-0. STA1 an OBO of "3" There are three available RUs, thus STA1 wins contention, randomly selecting RU2 (from RU1, RU2, RU3) for transmission. STA2 has an OBO of "5", and thus does not win contention and will wait for a next trigger frame. Unassociated STA3 has an OBO of "4". As there are two available RUs (RU4, RU5), STA3 also does not win contention, and so will also wait for a next trigger frame. STA4 has been previously assigned RU6, and so transmits on RU6. After a short interframe spacing (SIFS), STA1 and STA4 can transmit high efficiency trigger-based physical layer protocol data units (HE TB PPDUs) 1509 on their selected RUs. Following another SIFS, AP can issue a multi-station block acknowledgement (ACK) 1511.

FIG. 15A shows a second trigger frame 1503-1 and corresponding operations 1507-1. Such operations are understood from the description herein.

FIG. 15C shows the format of a conventional HE TB PPDU compatible with the IEEE 802.11ax standard. The HE TB PPDU can include pre-HE fields that can be transmitted across a full band (i.e., 20 MHz). A remaining portion can be transmitted in the RU.

UORA can improve communications between multiple STAs and an AP prior to—association by giving the opportunity of unassociated STAs to contact the AP. For post association STAs, UORA can help STAs to communicate buffer status register (BSR) or other information without occupying the entire primary or full bandwidth. This provides for more efficient use of the channel.

BRIEF DESCRIPTION OF THE DRAWINGS

FIGS. 15A to 15C are diagram showing conventional uplink OFDMA-based random access (UORA) operations.

DETAILED DESCRIPTION

According to embodiments, a wireless system can operate on one or more channels, and include multiple access modes in which parallel transmissions can be made on portions of the channel (e.g., resource units (RUs)). A broadcast trigger communication can indicate a random access mode and identify RUs available for random access (RA RUs). In response to the trigger communication, stations (STAs) can execute a contention procedure to try to win a RA RU for transmission. If the STA wins contention, it can transmit on a selected RA RU. If a STA does not win contention, the STA can monitor transmissions following the trigger communication to determine if any RA RUs are still available. If a RA RU is available, the STA not winning contention can transmit on the available RA RU.

In some embodiments, in response to a trigger communication, a STA winning contention can transmit a request-to-send-like (RTS-like) transmission on its selected RU. An access point (AP) can return a clear-to-send-like (CTS-like) transmission to indicate if an RU corresponding to the CTS-like transmission is available. A STA not winning contention can monitor the CTS-like transmission to determine if any RA RUs remain available, and then transmit on an available RA RUs. In some embodiments, RTS-like transmissions can include physical layer signals transmitted in the RU. In some embodiments, CTS-like transmissions can include physical layer signals returned in the RU. In some embodiments, CTS-like transmissions can include a multi-STA data frame transmitted across the channel (i.e., not only in an RU).

In some embodiments, in response to a trigger communication, a STA winning contention can transmit one or more predetermined signals before data transmissions. A STA not winning contention can monitor the RUs for the predetermined signals to determine which RA RUs remain available, and then transmit on an available RA RU. Parallel transmissions on RA RUs for STAs winning contention and not winning contention can be in parallel with one another.

Figure 1:
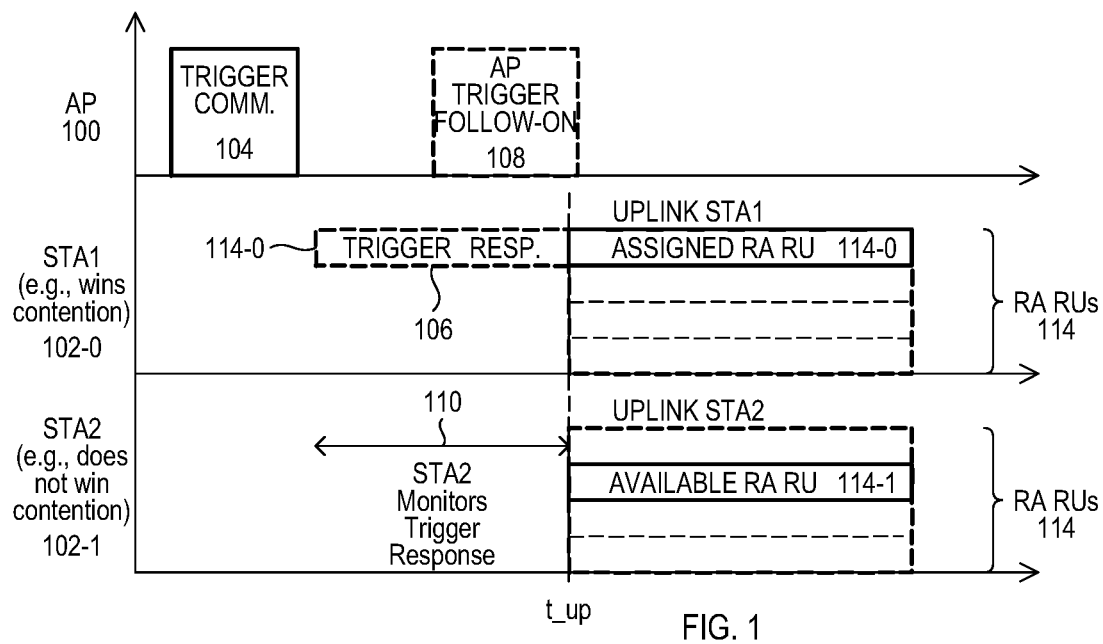
FIG. 1 is a timing diagram showing operations for random access to resource units (RUs) according to an embodiment.

FIG. 1 is a timing diagram showing wireless system operations according to an embodiment. Transmissions of the system can occur in a channel (i.e., range of frequencies) that can be divided into a number of RUs 114 capable of carrying transmissions from different sources in parallel. FIG. 1 shows transmissions for an AP 100 and two stations: STA1 102-0 and STA2 102-1.

AP 100 can issue a trigger communication 104. A trigger communication 104 can indicate that random access to RUs can occur. In some embodiments, trigger communication 104 can indicate which RUs are available for random access (indicate RA RUs). In response to trigger communication 104, STAs 102-0/1 can execute a contention process to determine if they may transmit on a RA RU. In FIG. 1, STA1 102-0 wins contention and selects RA RU 114-0 for transmission. STA2 102-1 does not win contention for any RA RU.

In response to winning contention, STA1 102-0 can transmit a trigger response 106. A trigger response 106 can be sent in a selected RU 114-0. In some embodiments, a trigger response 106 can be a physical layer signal (e.g., training field). However, in other embodiments a trigger response 106 can be a data frame having a predetermined format (e.g., RTS frame within RU).

In some embodiments, AP 100 can transmit a follow-on signal 108. Follow-on signal 108 can be in response to transmissions from STAs winning contention (e.g., trigger response 114-0). A follow-on signal 108 can indicate which RA RUs have been taken by STAs winning contention. In some embodiments, a follow-on signal 108 can be transmitted within RA RUs selected by STAs that win contention. However, in other embodiments a follow-on signal can sent across a transmission channel. In alternate embodiments, AP 100 does provide any follow-on transmission between trigger communication 104 and uplink data from STAs.

In response to not winning contention for an RA RU, STA2 102-1 can monitor transmissions (shown as 110) following a trigger communication 104, and from such transmissions determine which RA RUs remain available (e.g., not selected by a contention process). In FIG. 1, RA RU 114-1 remains available, and STA2 selects it for transmission.

In the embodiment shown, STA1 and STA2 (102-0/1) can use their RA RUs (114-0/1) to transmit uplink data in parallel to AP 100. In some embodiments, such uplink data transmissions can start at the same time (shown as t_up).

In this way, following a trigger communication for random access to RUs, STAs that do not win contention for an RA RU can monitor responses from STAs winning contention and/or an AP to discover RA RU that remain available. STAs not winning contention can then transmit on such remaining RA RUs.

Figure 2A:
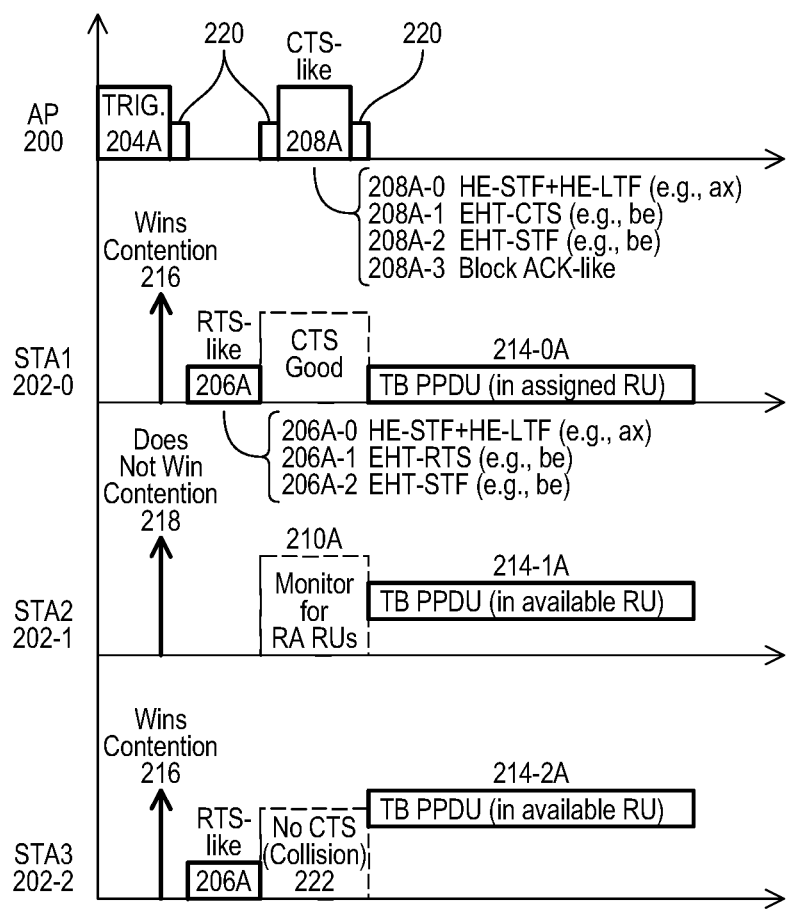
FIGS. 2A and 2B are timing diagrams showing operations for random access to RUs according to other embodiments.

FIG. 2A is a timing diagram showing wireless system operations according to another embodiment. In some embodiments, the operations of FIG. 2A can be one implementation of those shown in FIG. 1. FIG. 2A shows operations in which STAs winning contention for an RA RU can send a request-to-send-like (RTS-like) transmission in their selected RA RU. In response, an AP can return a clear-to-send-like (CTS-like) transmission. It is understood that RTS-like transmissions can take any suitable form that can inform an AP of a STA's selected RA RU, including physical layer signals as well as data frames with predetermined fields. Similarly, CTS-like transmissions can take any suitable form indicating whether a requested RA RU can or cannot be used by a requesting STA. A CTS-like transmissions can be sent in a requesting RA RU, or across a full channel.

Referring still to FIG. 2A, an AP can issue a trigger frame 204A. A trigger frame 204A can be a broadcast frame that notifies STAs of a random access opportunity for transmission on RA RUs. A trigger frame 204A can identify which RUs are available for random access. In some embodiments, a trigger frame 204A can indicate RA RUs for STAs associated with the AP, RA RUs for unassociated STAs, and RUs already assigned (and thus not RUs available for random access). In some embodiments, a trigger frame 204A can be an uplink OFDMA-based random access (UORA) trigger frame compatible with the IEEE 802.11ax and/or 802.11be standards.

In response to trigger frame 204A, STAs 202-0/1/2 having data for transmission can execute a contention process to "win" contention for RA RUs indicated as being available. In some embodiments, a contention process can be compatible with the UORA contention process indicated by the IEEE 802.11ax standard. In FIG. 2A, STA1 202-0 and STA3

202-2 can win contention (represented by 216) for an RA RU. STA2 202-1 does not win contention (represented by 218) for any RA RU.

Following a predetermined delay 220, STAs winning contention, such as STA1 and STA3 (202-0/2), can issue an RTS-like transmission 206A. In some embodiments, a predetermined delay 220 can be a short interframe spacing (SIFS) according to an IEEE 802.11 wireless standard.

All or a portion of RTS-like transmission 206A can be sent in the selected RA RU. As noted herein, an RTS-like transmission 206A can take any suitable form. In some embodiments, an RTS-like transmission 206A can be a physical layer signaling. Examples of physical layer RTS-like transmissions can include, but are not limited to: a high-efficiency short training field (HE-STF) followed by a HE long training field (HE-LTF) 206A-0 compatible with the IEEE 082.11ax standard or an enhanced high throughput STF (EHT-STF) 206A-2 compatible with the IEEE 082.11be standard. In other embodiments, RTS-like transmission 206A can include a data frame of a predetermined format, for example, a data frame having fields corresponding to an EHT-RTS data frame according to the IEEE 802.11be standard, but transmitted within the selected RA RU and not the entire channel.

Following another delay 220, in response to RTS-like 206A communications from STAs wining contention, AP 200 can issue CTS-like transmissions 208A. A CTS-like transmission 208A can take any suitable form. In some embodiments, a CTS-like transmission 208A can be a physical layer signal returned in the RUs on which RTS-like transmissions are received. In some embodiments, a CTS-like transmission can be a copy of a received RTS-like transmission. Examples of physical layer CTS-like transmissions can include, but are not limited to: an HE-STF followed by a HE-LTF 208A-0 compatible with the IEEE 082.11ax standard, an EHT-STF 208A-2 compatible with the IEEE 082.11be standard, or an EHT-STF and EHT-LTF (not shown) compatible with the IEEE 082.11be standard. In other embodiments, a CTS-like transmission 208A can include a data frame of a predetermined format. For example, a data frame having fields corresponding to an EHT-CTS data frame compatible with the IEEE 802.11be standard, but transmitted within the selected RA RU and not the entire channel.

STA1 202-0 can receive CTS-like transmission 208A, and determine that it is clear to send (CTS Good). As a result, STA1 202-0 can transmit a trigger-based physical layer protocol data unit (TB PPDU) in its assigned RU 214-0A.

STA2 202-1 can monitor CTS-like transmission 208A to determine which RA RUs remain available for use. In the embodiment shown, STA2 202-1 selects and transmits its own TB PPDU on available RA RU 214-1A.

STA3 202-2, unlike STA1 202-0, determines it is not clear to send from the CTS-like transmission 222. Such a result can indicate a collision (another STA has won contention for the RA RU). However, according to embodiments, STA3 202-2, like STA2 202-1, can determine which RA RUs remain available for use. In the embodiment shown, STA3 202-2 selects and transmits its own TB PPDU on available RA RU 214-2A.

In this way, STAs seeking access to an RA RU that do not win contention, or face a collision state, can examine CTS-like transmissions from an AP to determine if any other RA RUs are available for use.

Figure 2B:
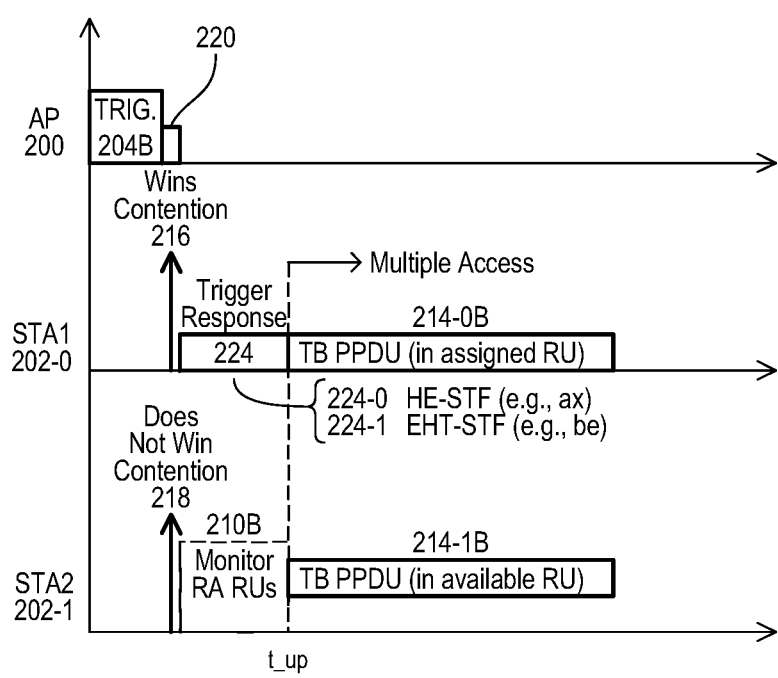

FIG. 2B is a timing diagram showing wireless system operations according to another embodiment. In some embodiments, the operations of FIG. 2B can be one implementation of those shown in FIG. 1. FIG. 2B shows operations in which STAs winning contention for an RA RU can transmit a response signal on their RA RU prior to transmitting uplink data.

Referring still to FIG. 2B, an AP 200 can issue a trigger frame 204B. A trigger frame 204B can take the form of that described for FIG. 2A or an equivalent.

In response to trigger frame 204B, STAs 202-0/1 having data for transmission can execute a contention process to "win" contention as described in FIG. 2A or an equivalent.

Following a predetermined delay 220, a STA winning contention, such as STA1 202-0, can transmit on its selected RA RU. Such a transmission can include a leading trigger response 224, followed by a TB PPDU in its selected RA RU 214-0B. A trigger response 224 can take any suitable form. In some embodiments, trigger response 224 can be a physical layer signaling. Examples of physical layer trigger response can include, but are not limited to: a HE-STF 224-0 compatible with the IEEE 082.1ax standard or an EHT-STF 224-1 compatible with the IEEE 082.11be standard.

A STA not winning contention, such as STA2 202-1, can monitor RA RUs 210B for trigger responses 224 from other STAs. From such information, a STA not winning contention can determine if any RA RUs are still available, and select an available RA RU for transmission. In FIG. 2B, STA2 202-1 selects available RA RU 214-1B to transmit a TB PPDU. In some embodiments, uplink data from STAs winning contention and those not winning contention can start at the same time (t_up).

In this way, STAs winning contention for an RA RU can lead transmissions in their RA RU with a trigger response which can be used by other STAs to determine if any other RA RUs are still available.

Figure 3:
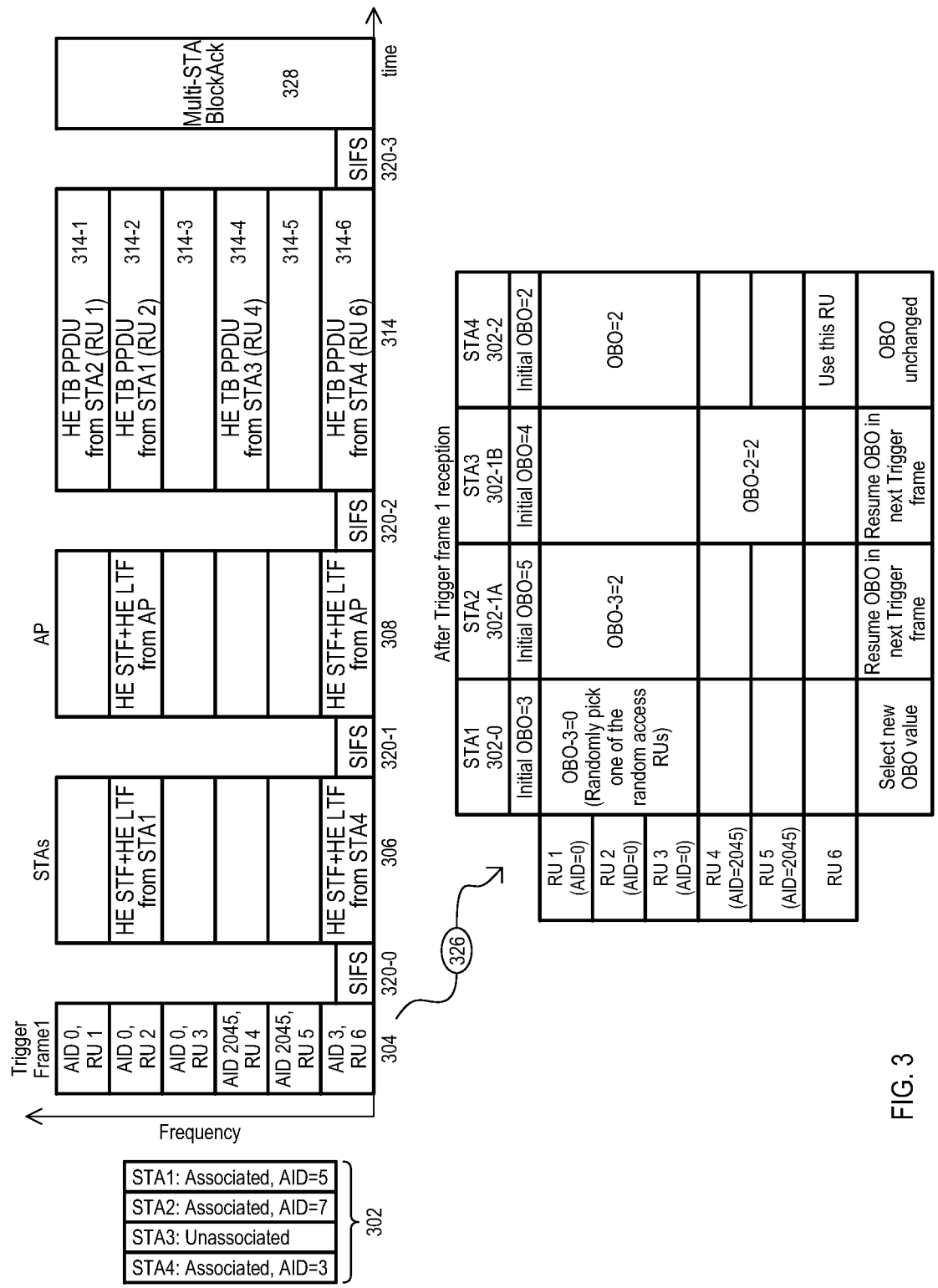
FIG. 3 includes diagrams showing random access to RUs using physical layer signaling to generate request-to-send-like (RTS-like) and clear-to-send-like (CTS-like) communications according to embodiments.

FIG. 3 includes diagrams showing random access to RUs according to another embodiment. FIG. 3 shows operations that can be added to, or incorporated with, operations compatible with the IEEE 802.11ax standard.

FIG. 3 shows a status of four STAs as 302. STA1 can be associated with an AP (association ID of 5 (AID=5)); STA2 can be associated (AID=7); STA3 can be unassociated; and STA4 can be associated (AID=3).

In a random access operation, an AP can issue a trigger frame 304. Trigger frame 304 can identify RUs and whether such RUs are available for random access. In FIG. 3, a channel can be divided into six RUs. RU1, RU2, RU3 can are given AID=0, which can identify them as RA RUs for associated STAs. RU4 and RU5 are given AID 2045 which can identify them RA RUs for unassociated STAs. RU6 is given AID=3, which indicates it is assigned to STA4. In some embodiments, a trigger frame 302 can be a UORA trigger frame compatible with the IEEE 802.11ax standard.

FIG. 3 shows STA responses to a trigger frame in a table 326. In response to trigger frame 304, the various STAs can execute a contention procedure to obtain access to a RA RU. In the embodiment shown, each STA can randomly generate a back-off value (OBO) that is decremented and compared to the number of available RA RUs to win contention. The operations of the various STAs will now be described.

STA1 has an initial OBO of 3. STA1 is associated and so can compare its OBO to the number of available RA RUs (which is 3, for RU1, RU2, RU3). According to the contention procedure, if OBO−#RA RU is zero or less, the STA wins contention. Accordingly, for STA1 OBO−3=0, so STA1 wins contention. In the embodiment shown, a STA winning contention can randomly select from available RA RUs. In the example shown, STA1 randomly selects RU2.

Following transmission of its uplink data, STA1 can select (e.g., randomly generate) a new OBO.

STA2 has an initial OBO of 5. Accordingly, the contention procedure yields OBO-3=2, and STA2 does not win contention. Conventionally, STA2 could resume a contention process using its OBO in a next trigger frame. However, as is shown in FIG. 3, STA2 may use a remaining available RA RU, in which case it may reset its OBO for a next trigger frame.

STA3 has an initial OBO of 4. Accordingly, the contention procedure (for unassociated STAs) yields OBO-2=2, and STA3 does not win contention.

STA4 has an initial OBO of 2. However, it has been assigned RU6, and so will transmit on RU6.

In some embodiments, STAs can execute contention procedures compatible with UORA of the IEEE 802.11ax standard.

Following a SIFS 320-0, STAs winning contention and/or STAs having an assigned RU can issue an RTS-like signal 306 on their RUs. In the example shown, an RTS-like signal 306 can be physical layer signals composed of an HE STF and HE LTF. Thus, STA1 can transmit HE STF+HE LTF in RU2, while STA4 can do the same in RU6.

Following another SIFS 320-1, the AP can issue CTS-like signals 308 in response to received RTS-like signals. In particular, if an AP determines an RU requested by a STA is available, the AP can indicate so with the CTS-like signal. In the embodiment shown, AP can answer with signaling matching that of the RTS-like signal. Thus, AP generates a HE STF+HE LTF on RU2, signaling to STA1 that it is free to use RU2, and generates a HE STF+HE LTF on RU6, signaling to STA4 that it is free to use RU6. In some embodiments, HE STF+HE LTF transmissions can be compatible with the IEEE 802.11ax standard. As noted herein, while the embodiment of FIG. 3 shows CTS-like signals as transmissions sent in RUs, in other embodiments, a CTS-like signal can be transmitted over an entire channel.

In contrast to conventional approaches, according to embodiments, STAs not winning contention can monitor RA RUs to determine if any remain available. Thus, in FIG. 3, STA2 monitors at least RU1, RU2 and RU3. Upon detecting the CTS-like transmission from AP in RU2 (i.e., HE STF+ HE LTF), STA2 can determine that RU1 and RU3 remain available. STA2 can select from such RUs for transmissions. Such a selection can be according to any suitable method, including random selection, or a probability function. In FIG. 3, STA2 selects RU1. In the same fashion, unassociated STA3 monitors RU4 and RU5. Upon detecting no CTS-like transmissions on such RUs, STA3 can determine that both RUs remain available, and select one such available RU for transmission. In FIG. 3, STA3 selects RU4.

Following another SIFS 320-2, STAs can transmit data 314 on their selected RUs. In FIG. 3, STAs transmit HE TB PPDUs on their RUs. Thus, STA2 transmits on RU1 314-1 (selected by monitoring for CTS-like signals from AP); STA1 transmits on RU2 314-2 (selected by winning contention); STA3 transmits on RU4 (selected by monitoring for CTS-like signals from AP); and STA4 transmits on RU6 (previously assigned). In some embodiments, multiple access data transmissions 314 can be OFDMA transmissions compatible with the IEEE 802.11ax standard.

Following another SIFS 320-3, an AP can issue a multi-STA block acknowledgement (BlockAck) 330. BlockAck 330 can acknowledge that transmissions were received on RUs. In some embodiments, a BlockAck 330 can be compatible with the IEEE 802.11ax standard.

Figure 4A:
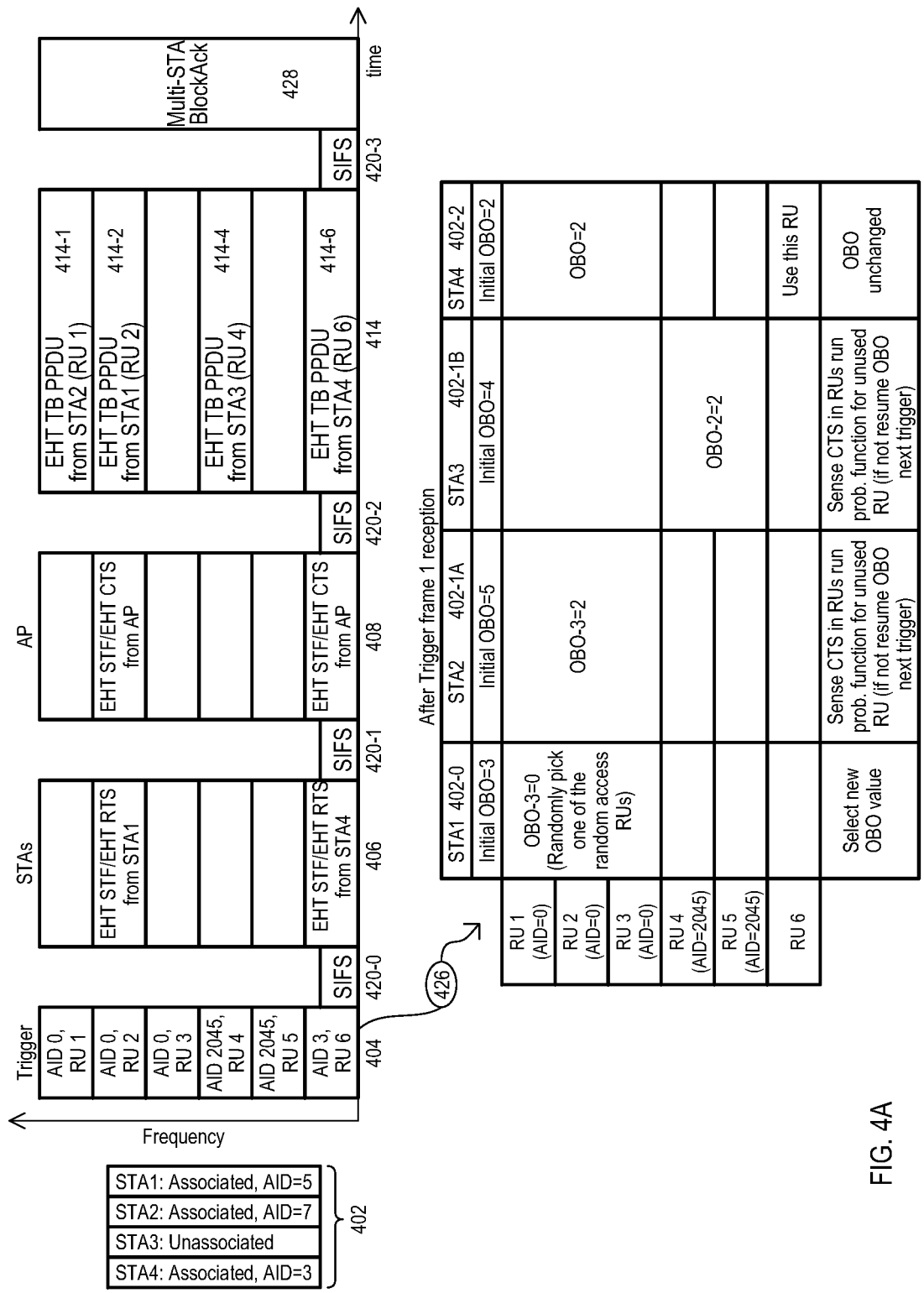
FIG. 4A includes diagrams showing random access to RUs using physical layer signaling or data frames transmitted in RUs to generate RTS-like and CTS-like communications according to embodiments.

FIG. 4A includes diagrams showing random access to RUs according to another embodiment. FIG. 4A shows operations that can be added to, or incorporated with, operations compatible with the IEEE 802.11be standard.

FIG. 4A includes operations like those of FIG. 3, and like items are referred to with the same reference characters but with the leading digit being a "4" instead of "3".

FIG. 4A differs from FIG. 3 in the type of RTS-like signals and CTS-like signals transmitted. RTS-like signals 406 from STAs can be EHT STF physical layer signaling in a selected RU. In some embodiments, an RTS-like signaling can include both an EHT STF and an EHT LTF. Alternatively, an RTS-like signal can be an EHT RTS data frame, at least a portion of which is transmitted in the RU. In some embodiments, an EHT RTS data frame can have fields corresponding to a full-channel RTS data frame.

CTS-like signals 408 can be EHT STF (or EHT STF+ EHT LTF) physical layer signaling returned in an RU in which an RTS-like signaling is received. Alternatively, a CTS-like signal can be an EHT CTS data frame, at least a portion of which is transmitted in the RU. In some embodiments, an EHT CTS data frame can have fields corresponding to a full-channel CTS data frame.

In some embodiments, any of contention processes (shown in table 426), EHT STF/EHT LTF signaling, uplink data 414, and BlockAck 428 can be compatible with the IEEE 802.11be standard.

Figure 4B:
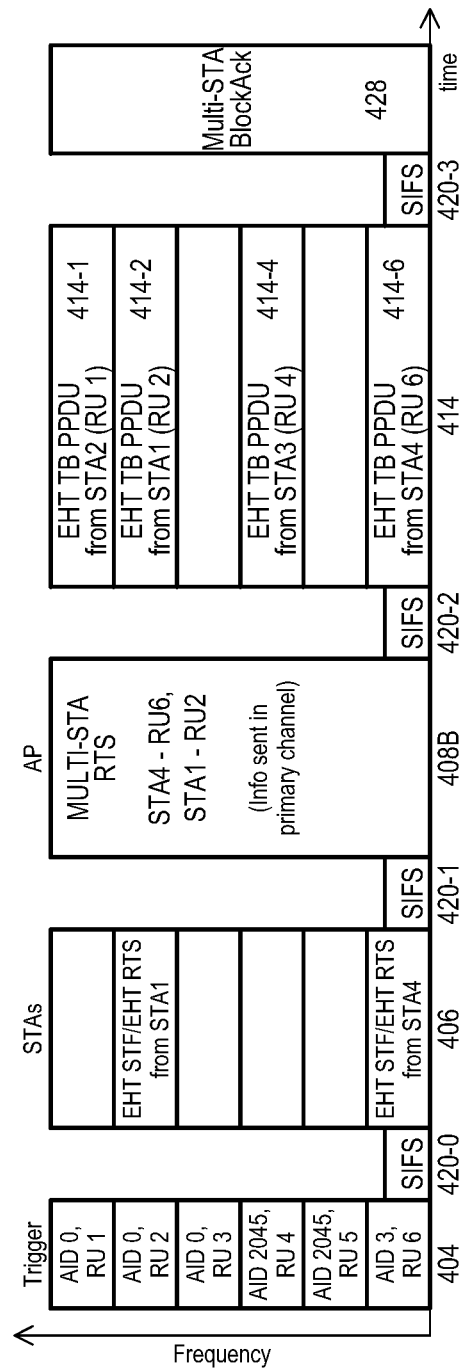
FIG. 4B is a timing diagram showing multi-station (STA) RTS data frame transmitted in a channel to indicate the status of random access RUs after access requests from STAs according to embodiments.

FIG. 4B is a timing diagram showing operations like of FIG. 4A, and like items are referred with the same reference characters. FIG. 4B differs from FIG. 4A in the type of CTS-like signal sent by an AP. Rather than return a signal in the RA RU of a requesting STA, an AP can transmit a full channel data frame 408B that carries RU use information. Such use information can include any of, but is not limited to: which RUs are clear to send and/or which RUs remain available.

Figure 5:
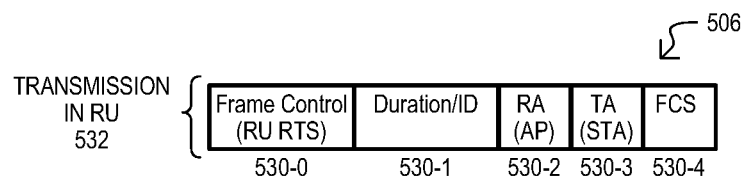
FIG. 5 is a diagram showing an RTS data frame that can be transmitted in an RU according to an embodiment.

FIG. 5 is a diagram showing an RU RTS 506 that can be included in embodiments. RU RTS 506 can be one example of an RTS-like transmission shown in FIGS. 4A/B as 406. RU RTS 506 can be a data frame transmitted in a selected RU 532 by a STA winning contention for the RU. In the embodiment shown, RU RTS 506 can include a number of fields that correspond to a conventional RTS transmission (i.e., an RTS transmitted across a full channel), however the transmission is restricted to the selected RA RU. Such fields can include, but are not limited to: frame control 530-0, duration 530-1, receive address (RA) 530-2, transmit address (TA) 530-3, and a frame check sequence (FCS) 530-4. Frame control field 530-0 can identify the data frame as an RU RTS, and in some embodiments can be a custom value (i.e., a value not taken by an existing standard) while in other embodiments the field can correspond to an RTS according to a standard. An RA field 530-2 can identify the receiving AP. A TA field 530-3 can identify the sending STA.

Figure 6A:
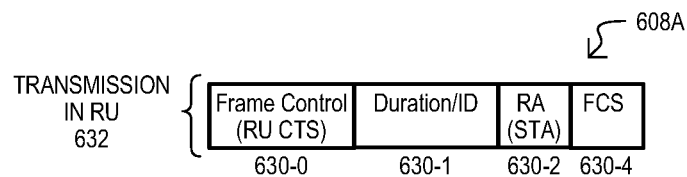
FIGS. 6A and 6B are diagrams showing CTS-like transmissions according to embodiments.

FIG. 6A is a diagram showing an RU CTS 608A that can be included in embodiments. RU CTS 608A can be one example of a CTS-like transmission shown in FIG. 4A as 508. RU CTS 608A can be a data frame returned in an RU on which an RU RTS was received. In the embodiment shown, RU CTS 608A can include a number of fields that correspond to a conventional, full-channel CTS transmission. However, the RU CTS transmission is restricted to the selected RU 632. Such fields can include, but are not limited to: frame control 630-0, duration 630-1, RA 630-2, and FCS 630-4. Frame control field 630-0 can identify the data frame as an RU CTS. An RA field 630-2 can identify the receiving STA. Frame control field 630-0 can include a custom value or that corresponding to a full-channel RTS.

It is understood that the RU RTS of FIG. 5 and RU CTS of FIG. 6A are but two of many possible embodiments. Alternate embodiments can include a fewer or greater numbers of fields. Further, as noted herein, in some embodiments, an RTS-like or CTS-like transmission can be a physical layer signaling in the RU.

Figure 6B:
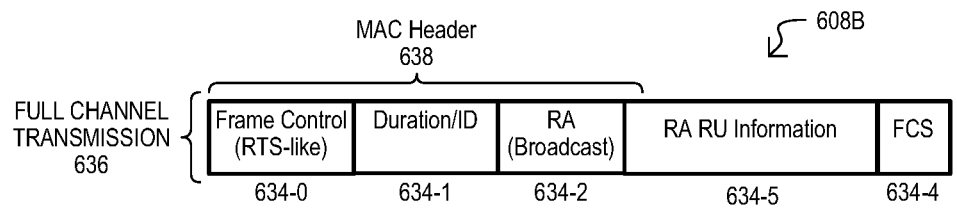

FIG. 6B is a diagram showing a multi-STA RA RU CTS 608B that can be included in embodiments. Multi-STA RA RU CTS 608B can be one example of a CTS-like transmission shown in FIG. 4B as 508B. Multi-STA RA RU CTS 608B can be a data frame transmitted over a channel 636 (as opposed to an RU), in response to RTS-like responses received from STAs on various RA RUs. In the embodiment shown, Multi-STA RA RU CTS 608B can include a number of fields, including but not limited to: frame control 634-0, duration 634-1, RA 634-2, RA RU information 634-5, and FCS 634-4. Frame control field 634-0 can identify the data frame as a Multi-STA RA RU CTS. An RA field 634-2 can be a broadcast address identifying the data frame for multiple STAs. A TA field 634-3 can identify the sending AP.

RA RU information 634-5 can be an information element indicating a status for RA RUs in response to RTS-like transmissions from STAs. From such information, STAs winning contention can determine they are clear to send (or not clear to send in the case of a collision) on their selected RA RU. In addition, STAs not winning contention can determine if any RA RUs remain available, and select one for transmission. In some embodiments, a multi-STA RA RU CTS 608B can have a format compatible with the IEEE 802.11ax and/or 802.11be standards, having a unique frame control value 634-0, and predetermined format for RA RU information 634-5. Frame control field 634-0, duration field 634-1, and RA Field 634-2 corresponding to a conventional MAC header 638.

Figure 7:
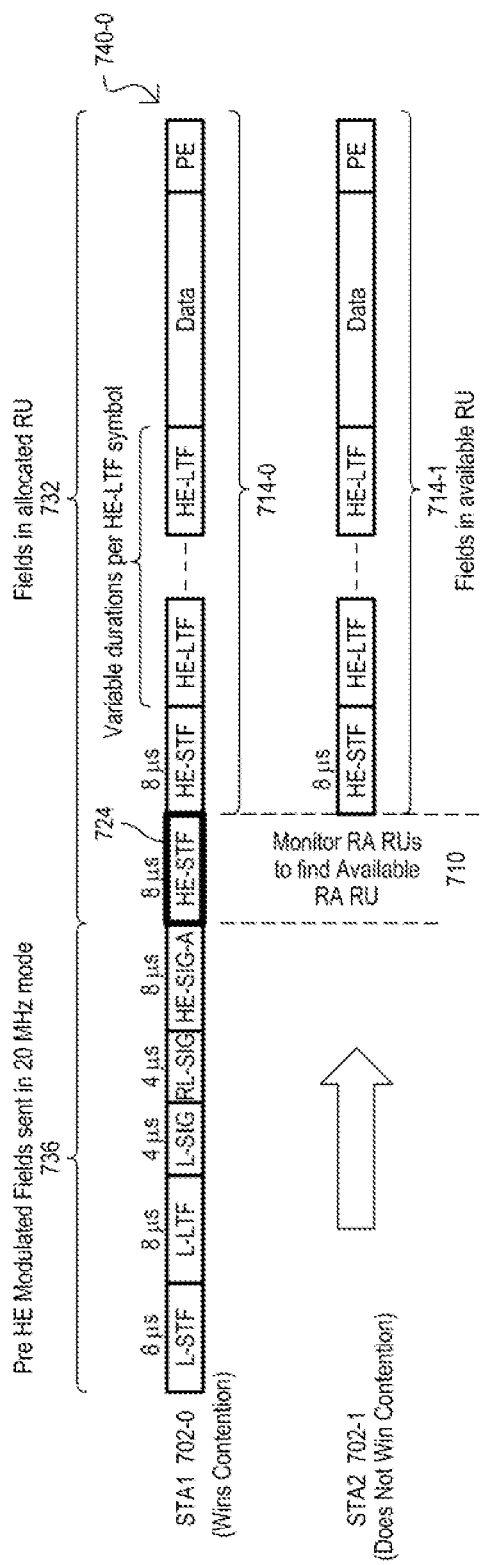
FIG. 7 is a timing diagram showing physical layer signaling from a STA winning contention for an RU that can be used by other STAs to determine remaining, available RUs according to embodiments.

FIG. 7 is a diagram showing a RU random access operations for STAs according to a further embodiment. The operations of FIG. 7 can be one example of those shown in FIG. 2B.

Figure 15B:
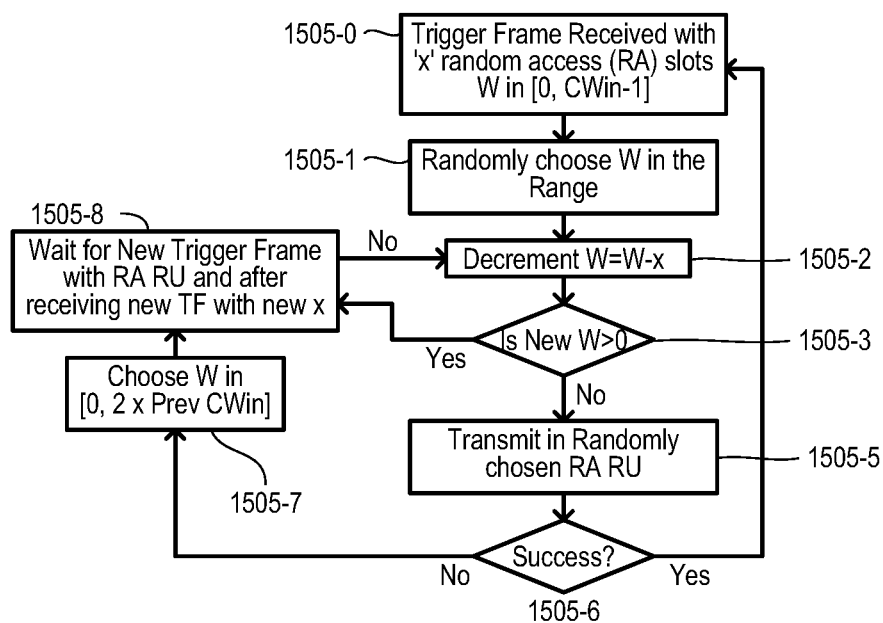
Figure 15C:
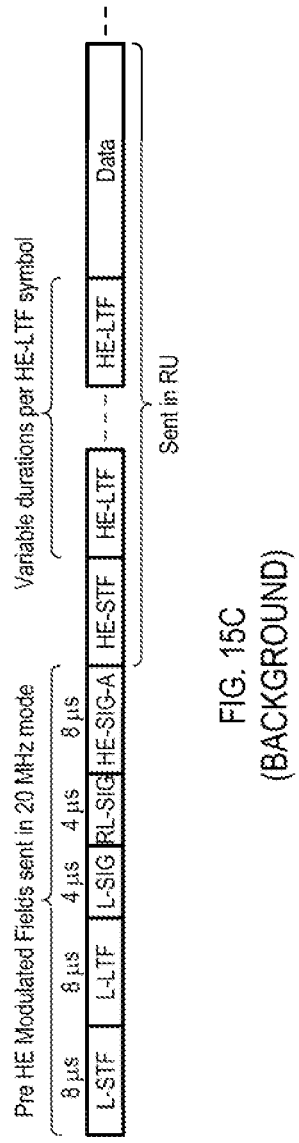

In response to a trigger frame indicating random access for RUs, STA1 702-0 can execute a contention procedure and win contention of an RA RU. Following a predetermined delay (e.g., SIFS), STA1 702-0 can make a contention win transmission 740-0. A contention win transmission 740-0 can be similar to a conventional UORA uplink transmission (such as that shown in FIG. 15C), however, one or more additional fields can be included for transmission in the selected RA RU. In the embodiment of FIG. 7, contention win transmission 740-0 can include fields transmitted in the full channel 736 (e.g., 20 MHz), shown as L-STF, L-LTF, L-SIG, RL-SIG, and HE-SIG-A. These can be followed by fields transmitted in the RU 732 (e.g., 8 MHz, 4 MHz, 2 MHz). Such fields can include an extra trigger response field 724, which in the embodiment shown, can be an HE-STF. Trigger response field 724 can be followed by fields corresponding to a conventional UORA uplink transmission 714-0, shown as HE-STF, a number of HE-LTF, Data and PE.

Referring still to FIG. 7, In response to the same trigger frame, STA2 702-1 can execute a contention procedure and not win contention of any RA RU. As a result, STA2 702-1 can monitor for trigger response fields 724 in allocated RA RUs. From such monitoring, STA2 can determine if any RA RUs remain available. If an RA RU is available, STA2 702-1 can transmit its own uplink data 714-1, in parallel with that of STA1 702-0 on its selected RA RU.

In some embodiments, the various fields shown in FIG. 7 can be compatible with the IEEE 802.11ax standard. However, alternate embodiments can be compatible with any other suitable standards. As but one example, full channel transmissions (e.g., 736) and RU transmissions (e.g., 732) can be compatible with the IEEE 802.11be standard. In such an embodiment, a trigger response (e.g., 724) can be an EHT-STF field.

Figure 8A:
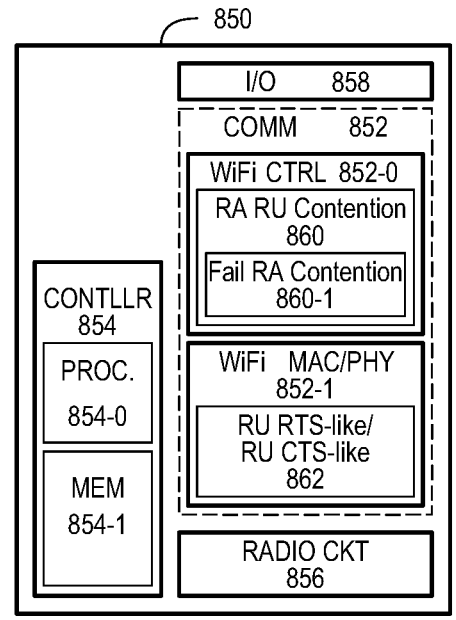
FIGS. 8A to 8C are diagrams of devices according to embodiments.

FIG. 8A is a block diagram of a device 850 according to embodiment. A device 850 can part of a STA or AP as described herein or equivalents. A device 850 can include communication circuits 852, controller 854, radio circuits 856, and input/output (I/O) circuits 858. Communication circuits 852 can include WiFi control circuits 852-0 and WiFi MAC/PHY circuits 852-1. WiFi control circuits 852-0 can execute communication operations compatible with one or more IEEE 802.11 wireless standards. This can include executing random access contention procedures according to such standards. However, WiFi control circuits 852-0 can also include procedures for failing contention (or a collision state) 860-1, as described herein or equivalents. In some embodiments, this can include monitoring for follow-on transmission to a trigger frame to determine RA RUs that remain available after all STAs have executed contention procedures, as described herein and equivalents.

WiFi MAC/PHY circuits 852-1 can control data transmission and reception according to one or more IEEE 802.11 wireless standards. However, unlike conventional circuits, WiFi MAC/PHY circuits 852-1 can generate/detect RTS-like and/or CTS-like physical layer signaling 862, which can include generating RTS and/or CTS data frames for transmission within RUs as described herein or equivalents.

A controller 854 can control transmissions by communication circuits 854. In some embodiments, a controller 854 can include circuits (or instructions executable by circuits) for controlling wireless transmissions according to other processes (e.g., applications). In the embodiment shown, a controller 854 can include a processor section 854-0 and a memory section 854-1.

Radio circuits 856 can include circuits for receiving and transmitting signals according to one or more IEEE 802.11 wireless standards. Radio circuits 856 can include any suitable circuits according to a selected protocol, and in some embodiments can include baseband circuits. In some embodiments, radio circuits 856 can transmit/receive on any internationally recognized industrial, scientific, or medical (ISM) band, as well as portions of such bands. In some embodiments, radio circuits 856 can operate in any or all of 2.4 GHz, 5 GHz or 6 GHz bands.

When included as part of a system, device 850 can include one or more antenna systems 857 connected to radio circuits 856. Antenna system 857 can include antennas for receiving and transmitting over multiple RUs of a channel. In some embodiments, antenna system 857 can be configured for data transmission and reception compatible with one or more IEEE 802.11 wireless standards.

I/O circuits 858 can enable control of device 850 by another system or device. I/O circuits 858 can include circuits that enable communication with the device according to any suitable method, including any of various serial data communication standards/methods including but not limited to: serial digital interface (SDI), universal serial bus (USB), universal asynchronous receiver transmitter (UART), $I^2C$, or $I^2S$.

Figure 8B:
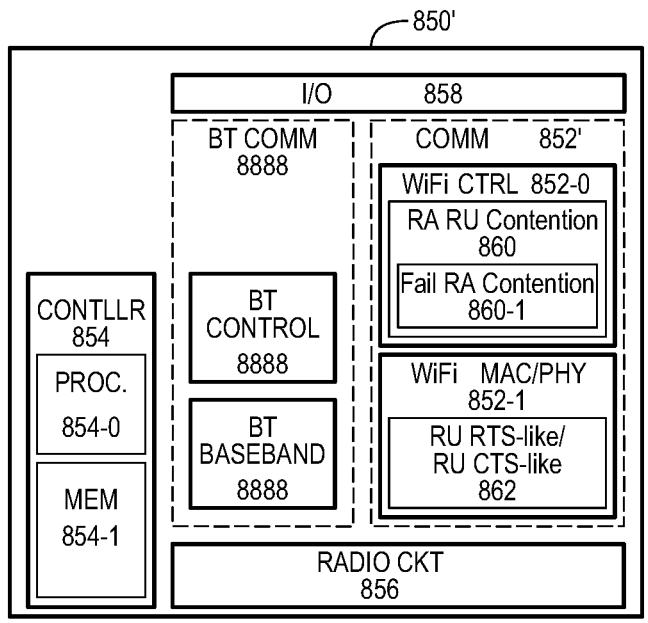

FIG. 8B is a block diagram of a combination device 850' according to an embodiment. Combination device 850' can include sections like those shown in FIG. 8A, including WiFi communication circuits 852', which can correspond to communication circuits shown as 852 in FIG. 8A. Other like sections are referred to by the same reference characters. In addition, combination device 850' can include second communication circuits 864 which can operate according to a different protocol. In the embodiment shown, second communication circuits 864 can be Bluetooth (BT) circuits including BT control circuits 864-0 and BT baseband circuits 864-1. BT circuits can operate in a 2.4 GHz band according to one or more BT standards. However, alternate embodiments can include different types of second communication circuits 852', including but not limited to cellular communication circuits compatible with GSM, GPRS, CDMA, MOBITEX or EDGE type networks.

Figure 8C:
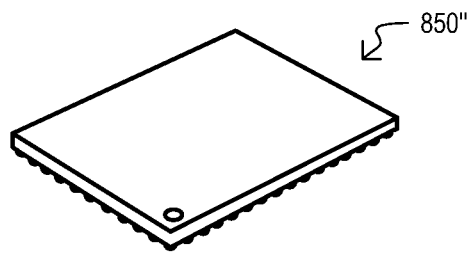

While device embodiments can include systems with various interconnected components, embodiments can also include unitary devices which can provide random access to RUs as described herein. In some embodiments, such unitary devices can be advantageously compact single integrated circuits (i.e., chips). FIG. 8C shows one particular example of a packaged single chip device 850". Device 850" can include circuits like those shown in FIG. 8A or 8B, or equivalents. However, it is understood that a device according to embodiments can include any other suitable integrated circuit packaging type, as well as direct bonding of a device chip onto a circuit board or substrate.

Figure 9:
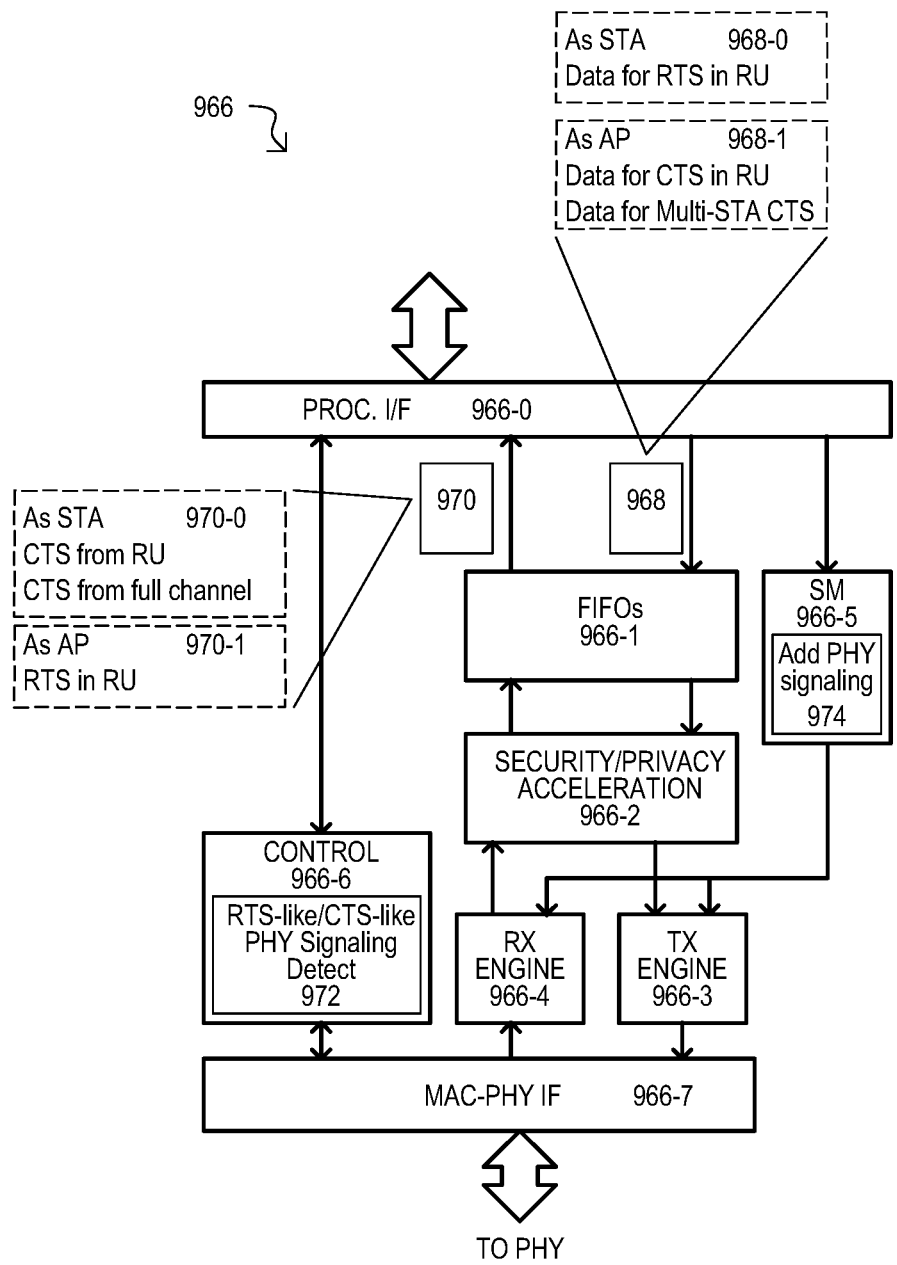
FIG. 9 is a block diagram of media access control circuits and operations according to embodiments.

FIG. 9 is a block diagram of MAC layer circuits 966 and operations according to embodiments. MAC layer circuits 966 can include a processor interface (IF) 966-0, FIFOS 966-1, acceleration circuits 966-2, a transmit (TX) engine 966-3, a receive (RX) engine 966-4, state machine 966-5, control circuits 966-6, and MAC-PHY IF 966-7. A processor IF 966-0 can receive data from and/or send data to a processor system. FIFOs 966-1 can include an output FIFO for receiving output data for inclusion into fields of transmitted data units and an input FIFO for receiving data from received data units for processing by a processor. Acceleration circuits 966-2 can include circuits specialized to accelerate security/privacy functions (e.g., encryption, decryption, authentication). A TX engine 966-3 can transfer data in a predetermined format for packetization and transmission via MAC-PHY IF 966-7. An RX engine 966-4 can organize and forward data received from MAC-PHY IF 966-7.

State machine 966-5 can control operations of TX and RX engines 966-3/4. In some embodiments, state machine 966-5 can be controlled and/or modified with inputs from a processor circuit via processor IF 966-0. Control circuits 966-6 can enable control PHY circuits (not shown) via MAC-PHY IF 966-7. In some embodiments, control circuits 966-6 can provide information from PHY circuits to processor IF 966-0. In some embodiments, control circuits 966-6 can include registers that can be programmed with configuration data and/or data read to obtain information on received data/signals.

Referring still to FIG. 9, when operating in a STA device, MAC layer circuits 966 can receive data for output 968 which can include, but is not limited to, values for constructing an RTS data frame 968-0 for transmission in an RU. In some embodiments, state machine 966-5 can be configured to add PHY signaling fields in RUs, which can serve as RTS-like signals. MAC layer circuits 966 can also provide input data 970 generated from received data frames, which can include, but is not limited to, values from a CTS data frame received in an RU or from a multi-STA CTS received on a full channel 970-0. In some embodiments, control circuits 966-6 can provide indications when PHY signaling is detected on RUs 972, such as CTS-like signals or trigger response signals.

When operating in an AP device, MAC layer circuits 966 can receive data for output 968 which can include, but is not limited to, values for constructing a CTS data frame for transmission in an RU, or for transmission across a channel as a multi-STA RTS 968-1. In some embodiments, state machine 966-5 can be configured to add PHY signaling fields in RUs, which can serve as CTS-like signals. MAC layer circuits 966 can also provide input data 970 generated from received data frames, which can include, but is not limited to, values from an RTS data frame. In some embodiments, control circuits 966-6 can provide indications when PHY signaling is detected on RUs, such as RTS-like signals for STAs.

MAC layer circuits and operations 966 described herein represent but particular embodiments and should not be construed as limiting. Embodiments can include any suitable MAC layer circuit and operations.

Figure 10:
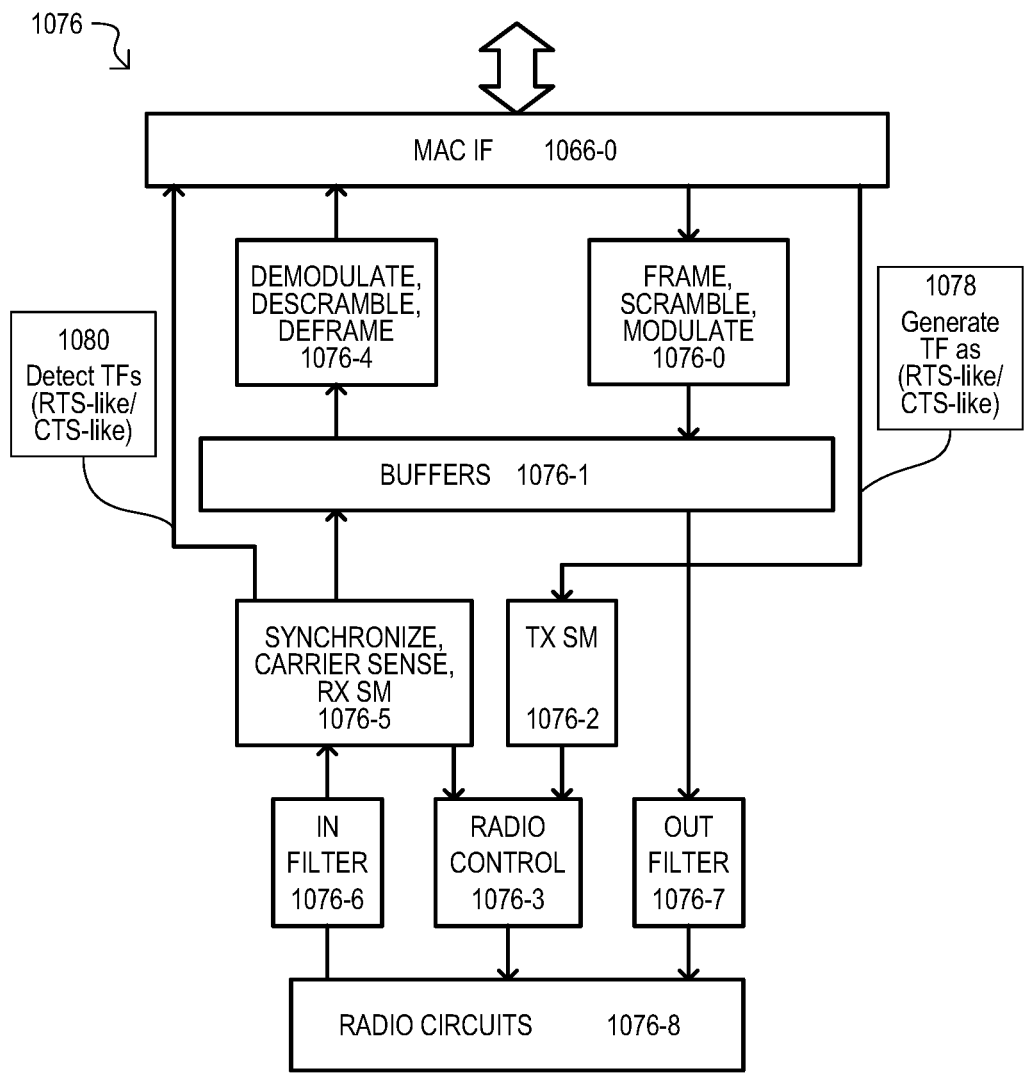
FIG. 10 is a block diagram of physical layer circuits and operations according to embodiments.

FIG. 10 is a block diagram of PHY circuits 1076 and operations according to embodiments. PHY circuits 1066 can include a MAC IF 1066-0, framing circuits 1076-0, buffers 1076-1, a PHY TX state machine 1076-2, radio control circuits 1076-3, deframing circuits 1076-4, PHY RX state machine 1076-5, input filter circuits 1076-6, output filter circuits 1076-7, and radio circuits 1076-8. MAC IF 1066-0 can interface with MAC circuits to receive data for transmission and provide data from received transmissions. Framing circuits 1076-0 can organize output data for transmission in specified data frame format. Framing circuits 1076-0 can perform additional functions, including scrambling and modulating data values. Buffers 1076-1 can buffer input and output data for transmissions. A PHY TX state machine 1076-2 can control output transmissions, including training fields for transmissions. Radio control circuits 1076-3 can control operations of radio circuits 1076-8 to transmit data frames and receive data frames. Deframing circuits 1076-4 can extract data from received data frames and can perform additional functions including demodulating and descrambling received data. PHY RX state machine 1076-5 can process signals generated by radio circuits 1076-8 and can include synchronization and carrier sense functions. Input filter circuits 1076-6 can include digital filter circuits for filtering input signals. Output filter circuits 1076-7 can control filtering of output signals.

According to embodiments, PHY circuits 1076 can be configured 1078 to generate physical layer signaling on RUs to function as RTS-like signals (for a STA) or CTS-like signals (for an AP) in a RU random access mode. Similarly, PHY circuits 1076 can detect physical layer signaling on RUs 1080 to which can be determined to be CTS-like signals (for a STA) or RTS-like signals (for an AP) in a RU random access mode. Detection of such fields can enable a device to confirm it may transmit in a selected RA RU or to determine which RA RUs remain available for use.

While the devices and operations disclosed show various methods according to embodiments, additional methods will now be described with reference to a number of flow diagrams.

Figure 11:
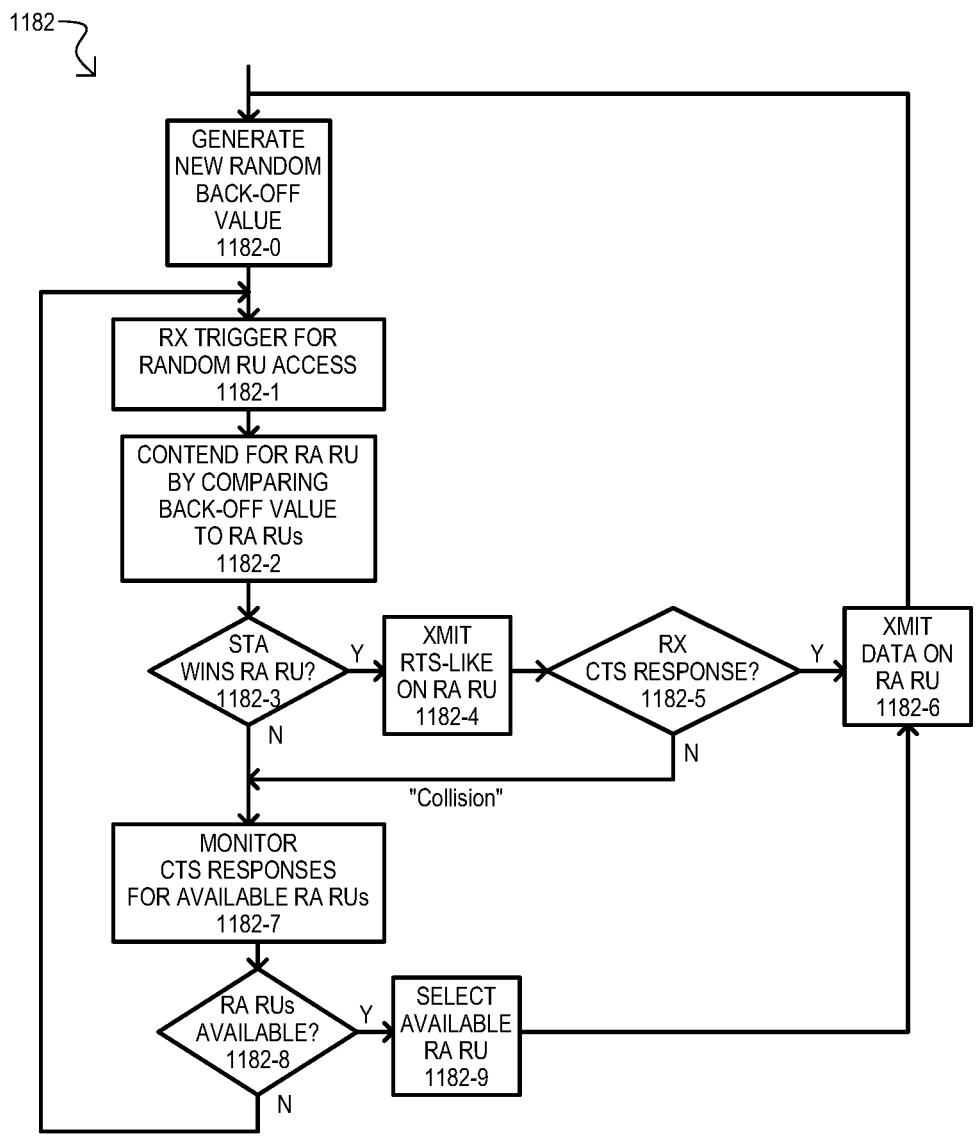
FIG. 11 is a flow diagram of a method for random access to RUs according to an embodiment.

FIG. 11 is a flow diagram of a method 1182 according to an embodiment. A method 1182 can be executed by a STA that seeks random access to RUs of a channel. A method 1182 can include generating a random back-off value 1182-0. Such an action can include generating a number that is changed (e.g., decremented) each time the device contends for an RA RU. In some embodiments, such an action can include generating an OBO value according to the UORA contention process for an IEEE 802.11 wireless standard.

A trigger for random access can be received 1182-1. Such an action can include detecting a trigger communication from a controlling device (e.g., AP) that indicates RUs available for random access. In some embodiments, such an action can include detecting a UORA random access trigger frame.

A STA can contend for an RA RU by comparing its back-off value to a number of RA RUs 1182-2. In some embodiments such an action can include executing a UORA contention process that determines if a back-off value is equal to or less than the number of available RA RUs.

If a STA wins contention (Y from 1182-3), the STA can transmit an RTS on the RA RU 1182-4. Such an action can include, but is not limited to, generating predetermined PHY signaling in the selected RU (e.g., one or more training fields) or transmitting an RTS data frame in the RU. If the STA receives a CTS response (Y from 1182-5), the STA can transmit data on its selected RA RU 1182-6. Receiving a CTS response 1182-5 can take the form of any of those described herein or equivalents, including but not limited to: a predetermined physical layer signaling on the RA RU or multi-STA data frame on the channel that identifies RA RUs that are clear to send. If the STA does not receive a CTS response (N from 1182-5), there can be a collision state, and the STA does not use the RA RU won by contention.

If a STA does not win contention (N from 1182-3) or there is a collision state (N from 1182-5), a STA can monitor for CTS responses for available RA RUs 1182-7. Such an action can take the form of any of those described herein or equivalents, including but not limited to: monitoring RA RUs for predetermined physical layer signaling from an AP, monitoring for CTS data frames in RA RUs from an AP, or monitoring for a multi-STA CTS data frame across the channel.

If an RA RU is available (Y from 1182-8), a STA can select an available RA RU 1182-9 and transmit data on the RA RU 1182-6. The selection of an available RA RU can take any suitable form, including but not limited to: a random selection or a predetermined probability function that can take into account previous RA RU activity.

Figure 12:
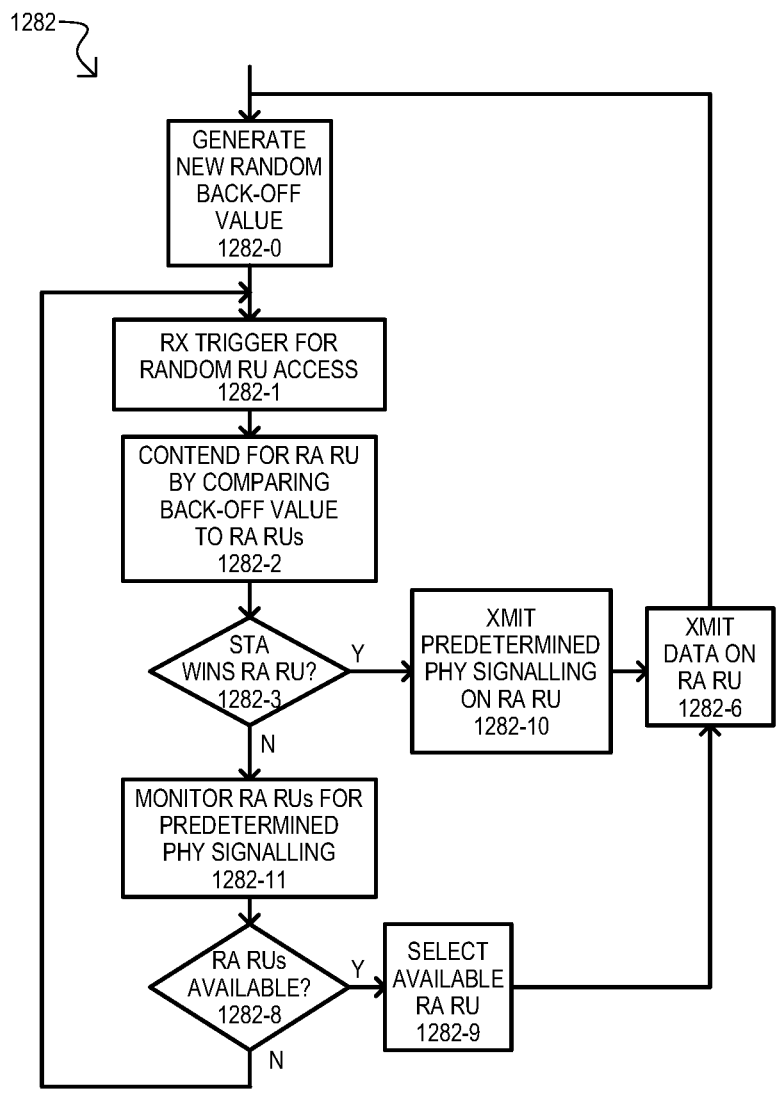
FIG. 12 is a flow diagram of a method for random access to RUs according to another embodiment.

FIG. 12 is a flow diagram of a method 1282 according to another embodiment. A method 1282 can be executed by a STA that seeks random access to RUs of a channel. A method 1282 can include actions like those of FIG. 11, and such like actions are referred to with the same reference character but with the leading digits begin "12" instead "11".

A method 1282 can differ from that of FIG. 11 in that, if a STA wins contention (Y from 1282-3), the STA can transmit predetermined PHY signaling on the RA RU 1282-10. Such PHY signaling can precede transmission of data 1282-6. In some embodiments, such an action can include the addition of one or more predetermined training fields or the lengthening of a training field at the start of an uplink transmission.

A method 1282 can also differ from that of FIG. 11 in that, if a STA does not win contention (N from 1282-3), the STA can monitor RA RUs for the predetermined PHY signaling 1282-11 from other STAs. From such monitoring, a STA can determine if any RA RUs remain available 1282-8.

Figure 13:
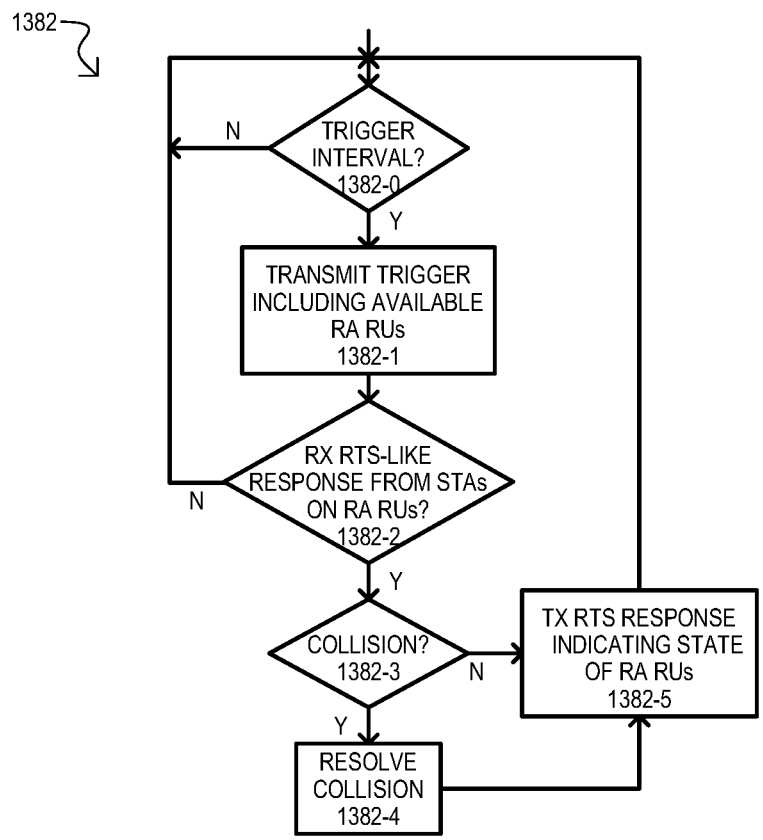
FIG. 13 is a flow diagram of a method for random access to RUs according to a further embodiment.

FIG. 13 is a flow diagram of a method 1382 according to another embodiment. A method 1382 can be executing by an AP to provide an RTS or RTS-like indication that can enable by STAs not winning contention to select from remaining, available RA RUs.

A method 1382 can include determining when a trigger interval has occurred 1382-0. A trigger interval can have been previously established by an AP based on service set configuration. At the trigger interval (Y from 1382-0), a trigger can be transmitted that includes an indication of available RA RUs 1382-1. Such an action can include transmitting a data frame on a full channel having one or more information elements that indicate RA RU availability and/or assignment. In some embodiments, such an action can include transmitting a UORA trigger frame compatible with the IEEE 802.11ax standard.

After transmitting a trigger, an AP can monitor RA RUs for RTS responses from STAs 1382-2. Such an action can include any of those described herein or equivalents, including but not limited to: monitoring RA RUs for predetermined PHY signaling (e.g., training fields) or for RTS data frames. If RTS responses are not received (N from 1382-2), a method can return to 1382-0 (wait for next trigger interval).

If RTS responses are received (Y from 1382-2), an AP can determine if a collision exists on any of the RA RUs 1382-3. Such an action can include checking if an RU on which an RTS response has been received has already been assigned. If there is a collision (Y from 1382-3), the collision can be resolved 1382-4 (i.e., an AP can determine winner according to a predetermined procedure). If there is no collision (N from 1382-3) or the collision has been resolved, an AP can transmit an RTS response that indicates a state of the RA RUs 1382-5. Such an action can include any of those described herein or equivalents, which can include but is not limited to: returning predetermined signaling on RA RUs, returning an RTS data frame on RA RUs, or transmitting a multi-STA response across the entire channel.

Figure 14:
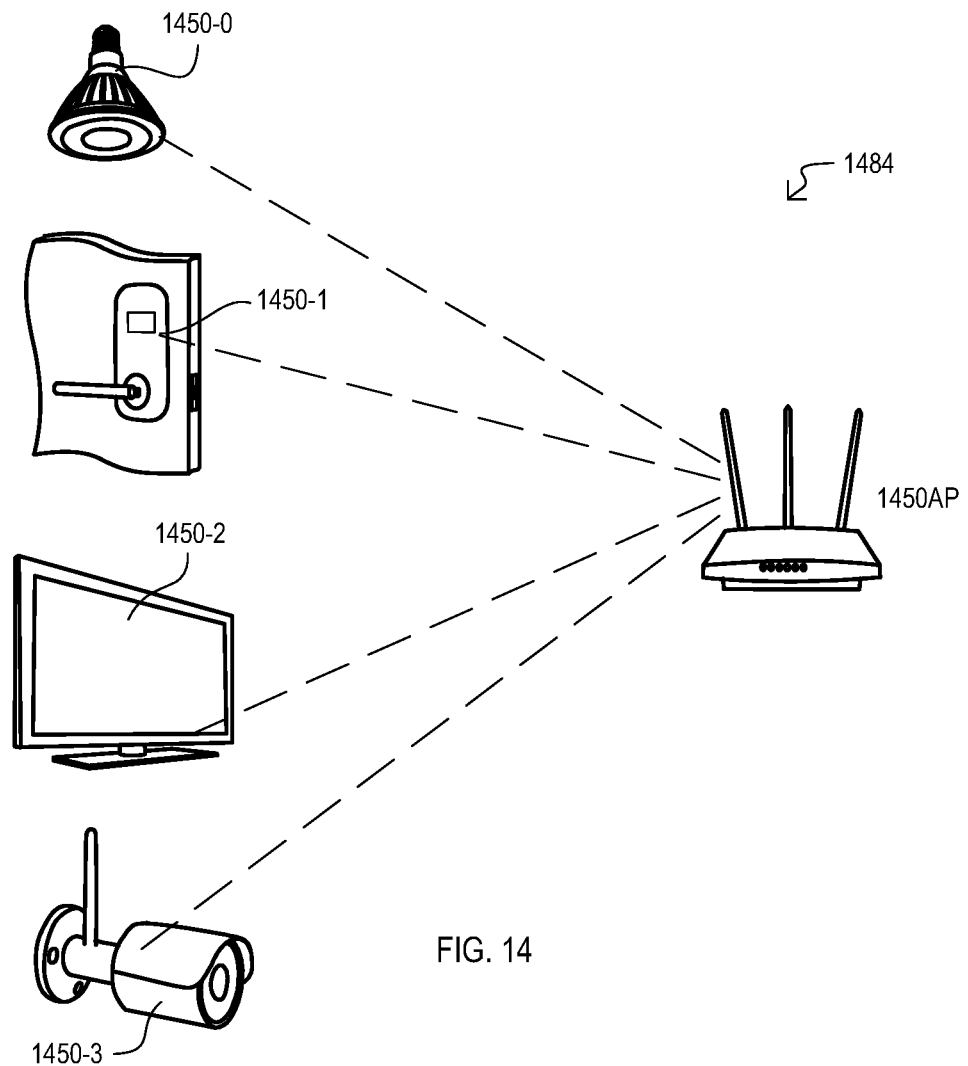
FIG. 14 is a diagram showing a system according to an embodiment.

FIG. 14 shows a system 1484 according to an embodiment. A system 1484 can include various local devices 1450-0 to -3 and a gateway device 1450AP. Local devices (1450-0 to -3) can be STAs as described herein or equivalents, including STAs having the ability to seek access to RA RUs after having failed contention for an RU or subject to a collision. Devices (1450-0 to -3) can be part of a basic service set (BSS) that includes gateway device 1450AP, or can be STAs seeking to join the BSS, or can be STAs of another BSS. Gateway device 1450AP can be an AP according to embodiments herein.

In the embodiment shown, local devices can be Internet-of-things (IoT) type devices, such as home automation devices, including lighting devices 1450-0, locking devices 1450-1, entertainment devices 1450-2 and security devices 1450-3, as but a few of many possible examples. The ability of such IoT devices (e.g., 1450-0 to -3) to efficiently use RA RUs can allow them to be designed with smaller bandwidths, for a more cost-effective solution to IoT networking needs.

Embodiments can increase the efficiency of random access to RUs by increasing the probability that an RA RU is used in a random access window. A maximum efficiency of conventional UORA is believed to be about 37%. By enabling follow on access to RA RUs for devices not winning contention and/or experiencing a collision, it is believed that efficiency can be increased to about 60%. At the same time, lower bounds to RA RU access can be essentially the same as conventional approaches (e.g., IEEE 802.11ax UORA).

Embodiments can improve the speed at which STAs can join a BSS, as unassociated STAs can efficiently use an RA RU uplink for on-boarding.

Embodiments that utilize RTS and CTS data frames transmitted in an RU can address "hidden node" situations. An AP can distinguish between stations requesting access on a same RA RU, and return a CTS data frame addressed to only one of the STAs.

These and other advantages would be evident to those skilled in the art.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   in a wireless device,
      receiving a trigger communication that identifies available random access resource units (RA RUs), the RA RUs being portions of transmission channel for a wireless system;
      in response to a back-off value and a number of available RA RUs, selecting or not selecting one RA RU as a transmission RA RU;
      in response to not selecting a transmission RA RU, monitoring for wireless responses following the trigger communication to determine unselected RA RUs;
      designating one unselected RA RUs as an alternate RA RU; and
      transmitting uplink data on the alternate RA RU; wherein
   the unselected RA RUs comprise any RA RUs that remain after other wireless devices have selected RA RUs in response to the trigger communication.

2. The method of claim 1, wherein:
   monitoring for wireless responses to the trigger communication includes monitoring for a clear-to-send-type (CTS-type) communication from an access point (AP) device.

3. The method of claim 2, wherein:
   the CTS-type communication comprises a physical layer signaling in any RA RU selected by another wireless device.

4. The method of claim 3, wherein:
   the physical layer signaling is selected from the group of:
      a high efficiency short training field (HE-STF) in combination with a high efficiency long training field (HE-LTF) compatible with the IEEE 802.1 lax standard, and
      at least one extremely high throughput STF (EHT-STF) compatible with the IEEE 802.11be standard.

5. The method of claim 2, wherein:
   the CTS-type communication comprises a CTS frame having portions transmitted only in the RA RU selected by another wireless device.

6. The method of claim 2, wherein:
   the CTS-type communication comprises a broadcast data frame transmitted on the transmission channel that indicates a state of RA RUs.

7. The method of claim 1, wherein:
   the monitoring for wireless responses to the trigger communication includes monitoring available RA RUs for a predetermined physical layer signaling that precedes data uplink transmissions of other wireless devices in their selected RA RUs; and
   transmitting uplink data on the alternate RA RU includes transmitting uplink data at the same time as the uplink transmissions of the other wireless devices.

8. The method of claim 1, further including:
   in response to selecting a transmission RA RU, transmitting a predetermined physical layer request-to-send (RTS) signaling on the transmission RA RU.

9. The method of claim 8, wherein:
   after transmitting the predetermined physical layer RTS signaling,
   in response to not receiving a clear-to-send-type (CTS-type) communication from an access point (AP) device,
      monitoring for predetermined physical layer RTS signaling from other devices to determine remaining unselected RA RUs,
      designating an RA RU from the remaining unselected RA RUs as a collision alternate RA RU, and
      transmitting uplink data on the collision alternate RA RU.

10. A device, comprising:
    communication circuits configured to
       receive wireless trigger communications that identify resource units available for random access (RA RUs), each RA RU being a portion of a transmission channel of a wireless system;
       according to a contention procedure, selecting or not selecting one available RA RU as a transmission RA RU;
       in response to not selecting a transmission RA RU, monitoring for response communications that follow the trigger communications,
       determining remaining unselected RA RUs from the response communications, the unselected RA RUs being any RA RUs that remain after other wireless devices have selected RA RUs in response to the trigger communication,
       designating one RA RU from the remaining unselected RA RUs as an alternate RA RU; and
       transmitting uplink data on the alternate RA RU.

11. The device of claim 10, wherein:
    the communication circuits include
       physical layer circuits configured to detect predetermined physical layer signaling fields in the available RA RUs, and
       the unselected RA RUs are those RA RUs in which the predetermined physical layer signaling fields are not detected following a trigger communication.

12. The device of claim 11, wherein:
the predetermined physical layer signaling fields are transmitted by an access point device (AP) and selected from the group of:
   a high efficiency short training field (HE-STF) in combination with a high efficiency long training field (HE-LTF) compatible with the IEEE 802.1lax standard, and
   at least one extremely high throughput STF (EHT-STF) compatible with the IEEE 802.11be standard.

13. The device of claim 11, wherein:
the predetermined physical layer signaling fields are transmitted by other devices in their selected RA RU.

14. The device of claim 10, wherein:
the communication circuits include data frame processing circuits configured to derive information from a block clear-to-send-type (CTS-type) data frame, the block CTS-type data frame identifying at least those RA RUs selected by other devices in response to a trigger communication; wherein
the block CTS-type data frame is transmitted on the channel.

15. A system, comprising:
a wireless device that includes,
   communication circuits configured to
   detect a wireless trigger communication that identifies resource units available for random access (RA RUs), each RA RU being a portion of a transmission channel of a wireless system;
   according to a contention procedure, selecting or not selecting one available RA RU as a transmission RA RU;
   in response to not selecting a transmission RA RU, identifying at least one unselected RA RUs from responses following the trigger communication, the unselected RA RUs being RA RUs that remains after other wireless devices have selected RA RUs in response to the trigger communication; and
   an antenna system configured to transmit uplink data on the unselected RA RU.

16. The system of claim 15, further including:
an access point (AP) device configured to
   detect request-to-send-like (RTS-like) transmissions from other wireless devices on a single RA RU for each wireless device, and
   in response to detecting an RTS-like transmission, transmit a clear-to-send-like (CTS-like) transmission that indicates if the RA RU corresponding the RTS-like transmission is available for the requesting wireless device.

17. The system of claim 16, wherein:
the CTS-like transmission is selected from the group of:
   an AP physical layer signaling in each single RA RU on which an RTS-like transmission is received, a CTS data frame in the single RA RU, and a data frame broadcast on the channel that identifies a status of the RA RUs.

18. The system of claim 17, wherein:
the AP physical layer signaling is selected from the group of
   a high efficiency short training field (HE-STF) in combination with a high efficiency long training field (HE-LTF) compatible with the IEEE 802.1lax standard, and
   at least one extremely high throughput STF (EHT-STF) compatible with the IEEE 802.11be standard.

19. The system of claim 15, wherein:
the wireless device communication circuits are further configured to, in response to selecting a transmission RA RU, transmit a predetermined physical layer signaling prior to transmitting uplink data on the selected RA RU.

20. The system of claim 19, wherein:
the predetermined physical layer signaling is selected from the group of
   a high efficiency short training field (HE-STF) compatible with the IEEE 802.11ax standard, and
   an extremely high throughput STF (EHT-STF) compatible with the IEEE 802.11be standard.

* * * * *